United States Patent [19]

Nadolink

[11] Patent Number: 5,050,136
[45] Date of Patent: Sep. 17, 1991

[54] SUPER POLYELECTROLYTIC COMMUNICATION LINKS

[75] Inventor: Richard H. Nadolink, Portsmouth, R.I.

[73] Assignee: The United States of America as represented by the Secretary of the Navy, Washington, D.C.

[21] Appl. No.: 590,717

[22] Filed: Oct. 1, 1990

[51] Int. Cl.$^5$ .............................................. H04B 11/00
[52] U.S. Cl. .................................. 367/134; 340/850;
385/125; 385/141
[58] Field of Search ................ 367/131, 134; 340/850,
340/852; 174/126.2; 427/162; 350/96.32, 96.34;
439/86; 526/285

[56] References Cited

U.S. PATENT DOCUMENTS

| | | | |
|---|---|---|---|
| 4,453,261 | 6/1984 | Waite et al. ......................... | 525/243 |
| 4,581,158 | 4/1986 | Lin ...................................... | 252/512 |
| 4,629,286 | 12/1986 | Fuse et al. .......................... | 350/96.1 |
| 4,748,273 | 5/1988 | Fakuda et al. ...................... | 526/285 |
| 4,855,243 | 8/1989 | Simieglava .......................... | 526/285 |
| 4,983,322 | 1/1991 | Elserbaumer ....................... | 252/518 |

OTHER PUBLICATIONS

Han et al., "Conveniently Processable Forms . . . Conductive Poly", Mol. Cryst. Liq. Cryst. (UK), Symp., 10/27/89, vol. 189, pp. 182–192.
Zhang et al., "Dielectric Analysis . . . Polystyrene Felius"; Bull. Lost. Chem. Res., Kyoto Univ., vol. 61, #4, pp. 265–281; 7/83.

Primary Examiner—Nelson Moskowitz
Attorney, Agent, or Firm—Michael J. McGowan; Prithvi C. Lall

[57] ABSTRACT

Apparatus and process for providing a communication link between separate submersibles and, in particularly, for providing communication between a launched submersible and a host submersible. A thread of polyelectrolytic material is provided in electrical communication with a launched submersible prior to launch and payed out and stretched as the launched submersible extends a distance from the host submersible to permit secure communication between the submersible, transmission of command signals for guidance and arming/-disarming, from the host to the launched submersible, and to receive data from deployed sensors. The conductive thread includes an organic solvent having dispersed therein a first polymer consisting of a water insoluble polymer that serves as the conductive polymer backbone and a second polymer consisting of a semi-water soluble high molecular weight polymer that effectively surrounds the conductive polymer backbone. The polymer components may be made from monomers on board the host submersible, if desired. When the communication link is no longer needed, self destruction by command or time actuated, leaving very little residual pollutants or evidence of the communication link, or any other indication of electronic information transmission.

9 Claims, 2 Drawing Sheets

SUPER POLYELECTROLYTIC COMMUNICATION LINKS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention relates generally to polyelectrolytic materials and their uses and relates specifically to an apparatus and process for providing long, economical, and temporary communication links in the undersea environment to provide temporary undersea communications between separate naval submersibles and between submersibles and/or objects.

(2) Description of Prior Art

The conductive properties of polyelectrolytes have been well known for an extended period of time. Biological polyelectrolytes, for example, are the basis for transmission of neural electrical messages and are important in understanding the operation of the human brain. Synthetic polyelectrolytes have been studied for a number of years. A number of recent publications directed to polyelectrolyte developments include "Soluble Conductors on the Way", NATURE Vol. 327, 4 June 87, p. 371 and twelve cited references in that article; "Spiders Hang From Freshly Extruded Thread: and Phase Changes During Elongational Flow of Polymer Solutions", NATURE Vol. 325, 15 Jan 87; a report on the "Second International Symposium on Polymer Electrolytes" by Dr. K. M. Abraham, EIC Laboratories, Inc., Norwood, Massachusetts (Siena, Italy, June 14,16, 1989, ESNIB 89-10); and ASME NEWS, Vol 10, No. 3, July 1990 report of "Entrepreneurial Physicist at Brookhaven Develops New Uses for Electrically Conducting Polymers".

At present, underwater communication links by direct contact between fixed or moving receivers and transmitters require a hard wire or fiber thread that must be stored in the form of a reel or coil and mechanically payed into the water in order to transmit electrons or photons over a conducting "wire". The internal mechanisms and physical constraints imposed by these present methods, along with relatively high attenuation of the transmitted energy with increasing distance, make long range communications difficult or impossible between two or more moving underwater objects. Direct communication links for submersibles to communicate (1) with one another, (2) with fixed objects at sea or on land, (3) between objects launched by submersibles and communicating with each other and the parent submersible, and (4) with surface and air objects through secondary means of communication, are essential at times for safety, accomplishment of the mission and for security reasons.

SUMMARY OF THE INVENTION

There is, thus, a definite need in the art for an improved system for providing reliable, secure and extended distance underwater communication links between submersible objects.

Accordingly, it is an object of the present invention to provide a communication link for use by both fixed and/or moving underwater objects that is operable at essentially an object speed, direction or maneuver.

Another object of the present invention is to provide an underwater communication link that may be readily deployed and utilized by submersibles over large distances and under secure conditions.

A further object of the present invention is to provide a polyelectrolytic communication link that may be manufactured and deployed underwater by a submersible to establish a communication link between the submersible and another object.

An additional object of the present invention is to provide improvements in the methods and techniques for communication underwater, and in particularly in sea water, without the need to extend hard electrical wire or traditional hard fiber links for the transmission of electricity and light.

A still further object of the present invention is a process of providing communication links between moving and/or stationary objects in an undersea environment.

Another object of the present invention is a polyelectrolytic communication link that may be deployed by one or more submersibles for establishing secure communications between moving or stationary submersibles and that can be rendered inoperable by a designated communicator, after use, without pollution of the environment.

According to the present invention, the foregoing and additional objects are attained by providing a polymer or mixture of polymers wherein at least one polymer has polyelectrolytic property characteristics, solvating the polymer and injecting a thread of the solvated polymer into the sea water. The injected thread stays intact by virtue of its enormous viscoelasticity or extensional viscosity of the polymer material. A weak electric or photo signal can be subtended by these polymer threads by virtue of their electrolytic properties. The polymer may be manufactured and stowed on board the submersible ready for use or it may be made from monomers and various other materials, including catalyst initiators, onboard one or more of the underwater objects. Communication by conventional electrical or photonic means can then take place between two or more submersibles connecting with the polymer thread over large distances and under secure conditions. When the need for communication is no longer needed, the destruction of the polymer lengths can be accomplished by a designated communicator by electrical, chemical or mechanical means and without pollution of the environment, since the majority of polymer constituents are readily biodegradable.

BRIEF DESCRIPTION OF THE DRAWINGS

A more complete appreciation of the invention and many of the attendant advantages thereof will be more readily apparent as the same becomes better understood in reference to the following description when considered in connection with the accompanying drawings wherein.

DESCRIPTION OF THE PREFERRED EMBODIMENT

Figure 1:
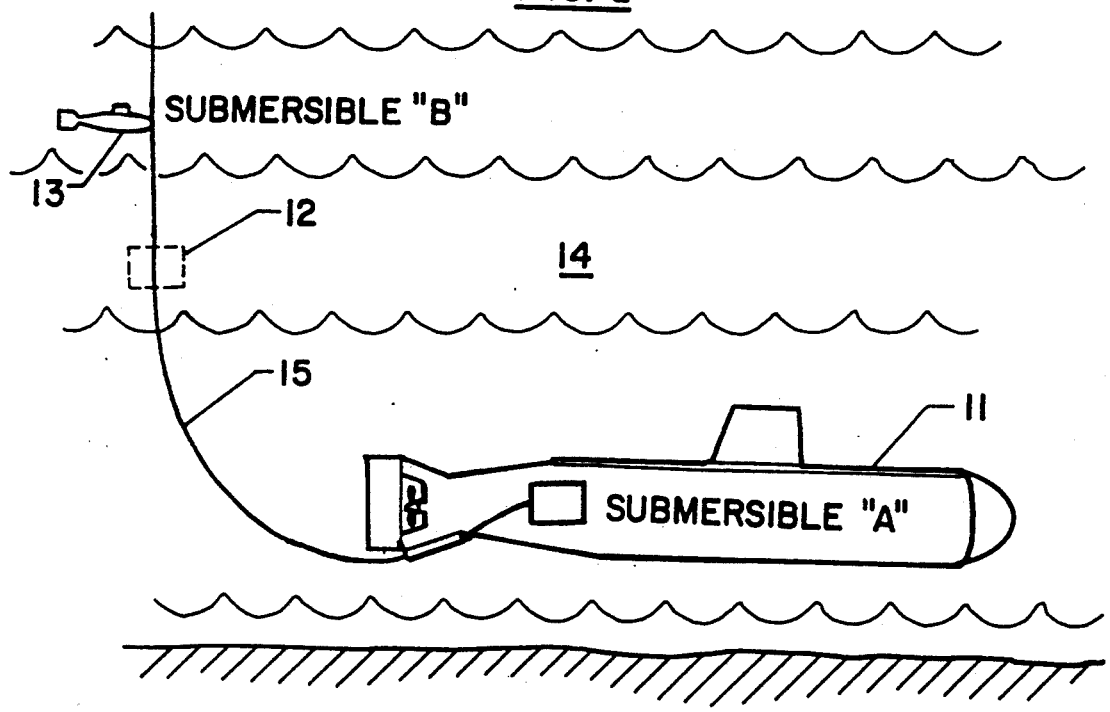
FIG. 1 is a schematic representation of two submersibles disposed in an ocean of seawater and provided with a thread of polyelectrolyte polymer therebetween. In this schematic illustration, submersible "A", designated by reference numeral 11 and submersible "B", designated by reference numeral 13, are submerged in any water environment 14. Electrical communications between submersibles 11 and 13 is maintained through a communication link in the form of a conductive polymer thread 15.

Although the invention may be practical using any vehicle, or even a land station, which is in contact with the water, FIG. 1 depicts an exemplary embodiment for practice of the present invention in which submersible 11 may be a submarine vehicle and submersible 13, a smaller submarine vehicle, a torpedo, or other device launched from submersible 11. Prior to launch, a thread of conductive polymer 15 is positioned in electrical contact with the appropriate signal sending and/or receiving station on board each submersible 11 and 13. Polymer thread 15, in some respects, may be compared to a monofilament fishing line, a high molecular weight polymer thread that is drawn from a melt. The differences including that, in polymer thread 15, the conducting backbone is inside the external shell, or monofilament equivalent, and is thus insulated but enjoys the flexibility of the thread.

Figure 2:
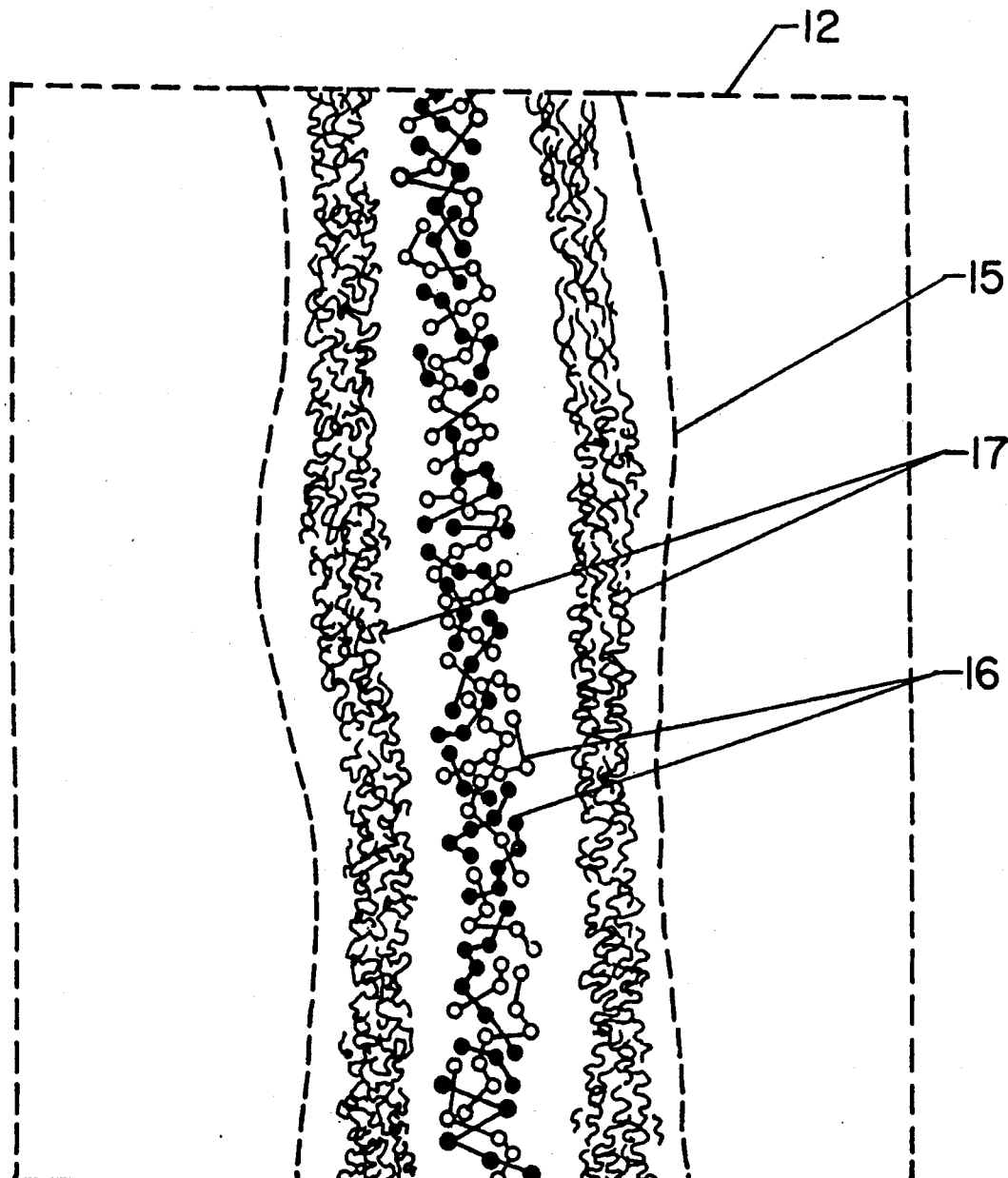
FIG. 2 is a blow-up of a minute length of the communication thread showing the cross sectional composition.

Referring now to FIG. 2, thread 15 contains a conductive polymer backbone 16, which in the preferred embodiment is a relatively low molecular weight polymer, but is not to be so restricted. The conductive polymer is fabricated in essentially singular molecular thread form. This backbone polymer is essentially insoluble in water and is surrounded by a relatively high molecular weight semi-water soluble polymer, all being dispersed within an organic solvent. Thread portion 17 becomes a quasi-water soluble cocoon that protects the inside conducting polymer micellular structure 16. Stretching of the micellular structure of thread 15 is facilitated due to the inherent physical property characteristics of high molecular weight viscoelastic polymers.

The semi-soluble nature of thread 15 provides tremendous flexibility for the filament and allows swelling of the thread in a sea water environment due to absorption. Over a long period of time, and due to the connective action of the thread, the entire thread 15, save the conductive backbone polymer itself, essentially self-destructs by being completely dissolved in the ocean. Other controlled destruction of the thread 15 will be further described hereinafter.

The monomers for making the conductive thread polymer 15 may be carried on board the submersible with the polymers being formed on an as-needed basis. Alternatively, the polymers may be previously prepared and dispersed from the submersible when desired. Conductive thread 15 serves as a communication link between the submersibles and may be used to transmit messages therebetween, to transmit guidance control signals to a launched submersible, as well as to effect remote arming or disarming of weapon systems carried by the launched submersible.

A prototypical conducting polymer portion 16 of thread 15 is polyacetylene:

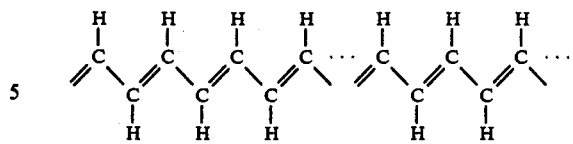

where the conjugated double bonds along the chain allow delocalization and mobility of electrons but also lock the chain into a rigid zig-zag. In theory, it is very desirable to have a communication link that is very non-soluble with sea water and one that will remain intact and isolated to prevent dissolution. This sea water insoluble polymer should remain isolated and insulated from the surrounding and weak conducting sea water to prevent degrading of any transmitted electrical signals by stray emissions into the sea water.

One system proposed to accomplish this object is to carry the polyacetylene into solution by forming a block or graft copolymer with a soluble polymer such as polystyrene. This results in a micellar solution that can form a thread containing millions, or even millions of millions, of micelles of conducting polyacetylene. This solution of polystyrene prepared to carry the polyacetylene may be made with any suitable organic solvent including, but not limited to, toluene, benzene, cyclohexane, nitro-propane and the like.

Other polyelectrolytic communications thread possibilities include 3-hexyl and 3-eicoylthiophenes which make soluble polymers that can be dissolved in the neutral or doped (and conducting) states. These polymers are formed by electrochemical polymerization.

Another reported system that could be employed in the practice of the present invention involves the spinning of fibers of soluble polythiophenones in blends with polystyrene or polyethylene oxide.

As mentioned hereinbefore, the polymer process to provide communication thread 15 may take place on board the submersibles 11 or 13; or prior to deployment of the submersibles. This is accomplished by employing a conducting polymer or a suitable monomer system capable of being polymerized to a conducting polymer and dissolving this polymer with polystyrene or a similar polymer to form the appropriate thread 15 that is very slowly or essentially semi-soluble in water. Optimum results of the present invention are dependent on having the properties of conductivity on the backbone of the low molecular weight material bound to the relatively high molecular weight polymer and positioned in a solvent that supports the extreme viscoelasticity of the threads while remaining insoluble in sea water. Toluene, benzene, cyclohexane and nitro-propane have the essential properties for the proper solvent in this system.

The flexibility of the polymer materials permits stretching of the polymer threads over many times (thousands) their normal length to thereby make the communication link of the present invention operable over a great distance range, independent of the relative speed of the submersible and uninterrupted by sudden or erratic maneuvering of the submersibles or convective turbulence effects of the aqueous surroundings. Also, since the communication between the two submersibles is confined to the polymer thread, the electronic signals transmitted may be maintained in secrecy and may not be intercepted by other parties. Since the polymer electrolytic thread may be formed on board, or dispersed from the submersible as needed, it can be actually produced as it is needed by the exiting or mother submersible. Additional conventional chemical, thermochemical and thermodynamic reactions may be employed, as needed, to produce the basic polymer for forming conductive thread 15.

When it is desired to terminate the communication link, conductive thread 15 may be rendered inoperative by the natural oxidation and destruction of the chemical bonds. This destruction may be stimulated by photonic action; the initial link may be broken and abandoned on board the host or receiving submersible by command; a destructive surge of current/voltage may be applied to destroy the thread link; or, a time activated chemical reaction may be incorporated into the polymer chain to effect a physical break in the polymer linkages to render the medium non-transmissive. When the preferred embodiment is destroyed, all the materials in conductive thread 15, are biodegraded with no pollution of the environment. The backbone material can be biodegradable by attack of oxygen or by ultraviolet radiation.

In addition to the specific polyelectrolytic conductors discussed herein, other known conducting polymers that may be employed in the practice of the present invention include the polyphenylenes, polypyrroles, polythiophenes, and others. It is thus seen that the present invention provides a new and novel communication system that permits secure transmissions of messages and/or commands between submersibles that could prove of invaluable worth in research and defense operations.

Although the invention has been described relative to specific embodiments thereof, it is not so limited and there are numerous variations and modifications of the invention that will be readily apparent to those skilled in the art in the light of the above teachings.

Thus, it will be understood that various changes in details, materials, steps and arrangement of parts, which have been herein described and illustrated in order to explain the nature of the invention, may be made by those skilled in the art within the principle and scope of the invention as expressed in the appended claims.

What is claimed is:

1. Apparatus for providing communication between a first submersible and a second submersible comprising:
   a first submersible and a second submersible that is launched by said first submersible;
   a polyelectrolytic polymer thread disposed in electrical contact with each of said first submersible and said second submersible;
   said polyelectrolytic polymer thread having the inherent physical property characteristics of being flexible and stretchable over thousands of times its natural length without breaking or rupturing to thereby permit communication between the first and second submersibles over extended distances and regardless of relative speed and maneuvering of said first and said second submersibles;
   said polyelectrolytic polymer thread including an organic solvent having dispersed therein a first polymer consisting of a water insoluble low molecular weight polymer and a second polymer consisting of a semi-water soluble high molecular weight polymer; and
   said first polymer forming a conductive polymer backbone in essentially singular molecular thread form and said second polymer effectively surrounding said conductive polymer backbone.

2. The apparatus of claim 1 wherein said organic solvent is selected from the group of solvents consisting of toluene, benzene, cyclohexane and nitro-propane.

3. The apparatus of claim 1 wherein said water insoluble low molecular weight polymer is selected from the group of low molecular weight polymers consisting of polyacetylenes, polyphenylenes, polypyrroles and polythiophenes.

4. The apparatus of claim 1 wherein said water insoluble low molecular weight polymer consists of polyacetylene and said high molecular weight polymer consists of polystyrene.

5. The apparatus of claim 1 wherein said first and said second polymers are manufactured and solvated from appropriate monomers and solvents respectively on board either submersible.

6. The apparatus of claim 1 wherein said first and said second polymers are dispersed in said organic solvent on board said first submersible and an end of said polyelectrolytic thread is secured to said second submersible prior to launch thereof and said polyelectrolytic thread is played out from said first submersible during movement of said second submersible relative to said first submersible after launch.

7. The apparatus of claim 1 including means for rendering said polyelectrolytic polymer thread inoperative as a communication link between said first and said second submersibles.

8. The apparatus of claim 7 wherein said means for rendering said polyelectrolytic polymer thread inoperative as a communication link between said first and said second submersibles includes (a) physical separation of said polyelectrolytic polymer thread from either of said first or said second submersible, (b) employing a time activated chemical reaction incorporated within said thread to effect a physical break in the polymer linkages and thereby render the thread non-transmissive, and (c) employing a destructive surge of current/voltage through said thread to destroy the thread link.

9. The apparatus of claim 1 wherein said semi-water soluble high molecular weight polymer and said organic solvent are biodegradable and contribute very little pollution to the environment when said polyelectrolytic polymer thread is rendered inoperative.

* * * * *